(12) United States Patent
Liu

(10) Patent No.: US 7,010,123 B1
(45) Date of Patent: Mar. 7, 2006

(54) INVISIBLE GRAPHICS CONTEXT IDENTIFYING SYSTEM AND FABRICATION METHOD THEREOF

(76) Inventor: Chao Liu, 1-701 Building of Dunghuan Road, Chaoyuan District, Beijing 10029 (CN)

( * ) Notice: Subject to any disclaimer, the term of this patent is extended or adjusted under 35 U.S.C. 154(b) by 0 days.

(21) Appl. No.: 09/869,528

(22) PCT Filed: Dec. 29, 1999

(86) PCT No.: PCT/CN99/00220

§ 371 (c)(1),
(2), (4) Date: Jun. 28, 2001

(87) PCT Pub. No.: WO00/41124

PCT Pub. Date: Jul. 13, 2000

(30) Foreign Application Priority Data

Dec. 30, 1998 (CN) .............................. 98126380 A

(51) Int. Cl.
*G09C 3/00* (2006.01)
*G09C 5/00* (2006.01)

(52) U.S. Cl. ........................................ 380/54; 382/100
(58) Field of Classification Search ................. 380/54; 382/100; 101/32; 358/3.28; 283/87, 93; 430/10; 235/457

See application file for complete search history.

(56) References Cited

U.S. PATENT DOCUMENTS

| | | | | |
|---|---|---|---|---|
| 4,512,581 A | * | 4/1985 | Levine ................... | 273/153 R |
| 5,056,142 A | * | 10/1991 | Lapointe et al. .............. | 380/54 |
| 5,284,364 A | * | 2/1994 | Jain ............................ | 283/87 |
| 5,443,579 A | * | 8/1995 | Tanaka et al. ................ | 283/93 |
| 5,461,239 A | | 10/1995 | Atherton | |
| 5,582,103 A | * | 12/1996 | Tanaka et al. ................ | 101/32 |
| 5,830,609 A | * | 11/1998 | Warner et al. ................ | 430/10 |
| 5,988,503 A | * | 11/1999 | Kuo ........................... | 235/457 |
| 5,995,638 A | * | 11/1999 | Amidror et al. ............ | 382/100 |
| 6,104,812 A | * | 8/2000 | Koltai et al. .................. | 380/51 |
| 6,750,985 B1 | * | 6/2004 | Rhoads ...................... | 358/3.28 |

FOREIGN PATENT DOCUMENTS

| | | |
|---|---|---|
| CN | 85100700 A | 1/1987 |
| CN | 2258303 Y | 7/1997 |
| WO | WO 95/02200 | 1/1995 |

* cited by examiner

*Primary Examiner*—Ayaz Sheikh
*Assistant Examiner*—Arezoo Sherkat
(74) *Attorney, Agent, or Firm*—Kilpatrick Stockton LLP

(57) ABSTRACT

The discrimination system of the cryptic graph-text document and manufacturing method thereof is to digitize and decompose the cryptic document and fix them onto the surfaces of the digital reader and printed sheet, which present themselves as the cryptic documents. An array of numerous miniaturized lenses with specific focal lengths is distributed on the surface of the reader. When the printed sheet is covered with a specific digital reader at a specific location, the corresponding document is revealed and presents as the original document and alternating the darkness of the pattern from heavy to light and from invisible to visible gradually while changing the visual angle. Several digital readers are matched to one printed sheet, resulting in different cryptic patterns accordingly. The discrimination system is intuitive, simple and speedy, and is difficult to imitate. This technique is good for making licenses, bills, money notes, stamps, packages of goods, and all others that require anti-counterfeiting marks attached.

7 Claims, 3 Drawing Sheets

FIG 1
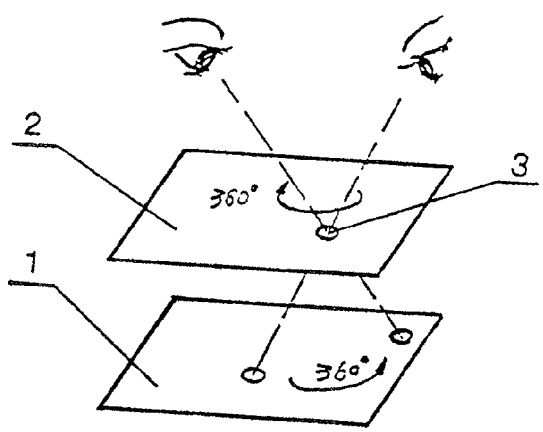
FIG 2                    FIG 3
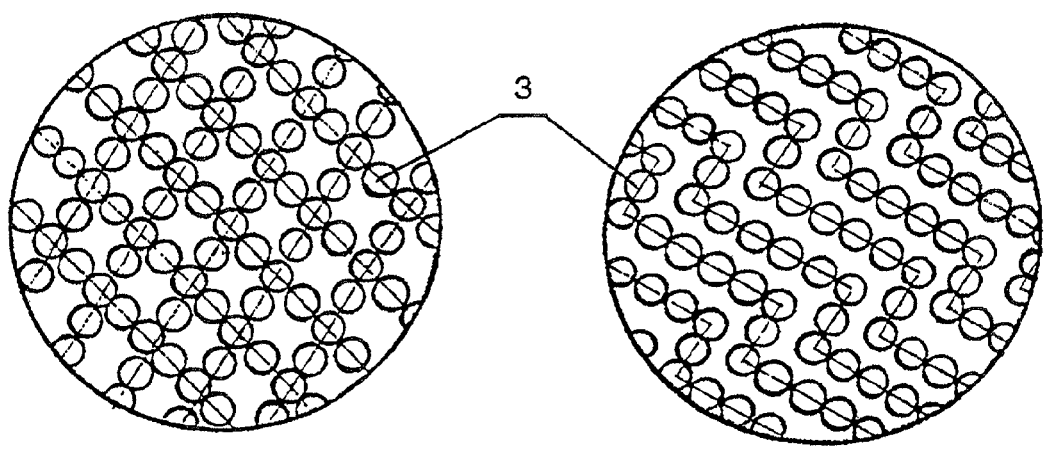

INVISIBLE GRAPHICS CONTEXT IDENTIFYING SYSTEM AND FABRICATION METHOD THEREOF

TECHNICAL FIELD OF THE INVENTION

The present invention relates to a system and method for the prevention of counterfeiting graphs and texts, and more particularly relates to a discrimination system of cryptic graphs-texts and a producing method thereof.

BACKGROUND OF THE INVENTION

In the commodity circulation, the institution of effective supervisory system and the questioning of the genuineness of the commodity are grave concerned by all countries. Practically, consumers are often confused by a large variety of imitation articles. The interests of most consumers and the manufacturers are infringed seriously, and consumers cannot find an effective way for distinguishing between genuine and imitation. They may even hesitate to buy, and the reputation of the manufacturers is injured unjustly. Due to the forcible action of the imitation articles, the market for famous products even shrinks seriously and their producers are forced to change the packaging and to make advertisements again and again, and expenses increase accordingly. On the other hand, the new imitation articles themselves are changed very soon. Often, the producers of the imitation articles have not been charged and they often get exorbitant profits. The related government agencies spend a lot of financial and very often they are alleviating symptoms only and do not effect a permanent cure. Of recent years, several measures such as so-called visional 3D labels or laser labels have been used, to resist the imitations and those labels are imitated again. People are looking for better anti-counterfeiting labels.

So far, the prior art for anti-counterfeiting patterns have used the combination of parallel streaky lines of different angle forming the cryptic graph-text patterns only. With small difference of different angles the pattern is revealed. By the use of parallel streaky gratings as a reader and placing the grating on the cryptic pattern with the relative correlation of two groups of streaks, the original pattern can also be seen. But the correlation is easy to be recognized; thus the counterfeiting pattern is easy to be imitated.

SUMMARY OF THE INVENTION

The present invention puts forward a discrimination system of a cryptic graph-text pattern and the producing method thereof. By the use of the 4D (4 parameters) technique it is possible to produce multiple graph-text combination in one copy, which increases the number of levels for anti-counterfeit and is more difficult to be decoded and imitated. This system can be connected to a compatible computer system for supervision and discrimination. Thus the pattern can also be read visually or by computer.

The technical solution of the invention is described as follows: The cryptic graph-text discrimination system includes a printed sheet and digital readers. On the surface of the printed sheet, there is high-density dot group of the complete cryptic document that is composed by plural cryptic documents and each of them is treated by a decomposing and digitizing technique. The sheet is made of transparent, translucent or non-transparent material. The high-density dot groups can also be printed on both sides of the sheet and in that case the sheet is made of transparent or translucent material.

The surface of the reader, as a whole or divided by several parts, is covered by different kind of omni-directional lens arrays and the surface of the vein is uneven or is smooth and many miniaturized lenses with specific focal lengths are distributed. All lenses are made of convex lenses or holes or both of them. The lenses are arranged in accordance with the pattern of the high-density dot groups of the individual cryptic graph-text document that is one of the digitized and decomposed cryptic graph-text documents.

The arrangement of the miniaturized lenses on the omni directional lens array is in grid form, in step shape, in wavelike pattern, or of special combination.

The digitized reader is made of transparent or translucent material such as plastic or colloid and can be a rigid card or a flexible card, and some other cryptic patterns are also fixed on the surface near the edges.

The above-mentioned printed sheet can be fixed on licenses, certificates, sealing strips, credit cards, different magnetic cards, computer software, hard discs, LDs, stamps, money notes, bills, receipts, birth certificates, contracts, permits, documents for clearing customs, packages of products, and can also be fixed on porcelain, metal, glass, molded plastic articles, wooden articles and dress material.

The procedure of producing the cryptic graph-text discrimination system is as follows:

a. Enciphering/digitizing the visible and cryptic graph-text documents step by step by the use of randomly generated enciphering system. Enciphering parameters of the multivariate function are assigned in each step, and then the parameters are deleted before the next step is commencing.

b. Then decompose the graph-text documents by an operational decomposing digitizing system and create individual cryptic patterns corresponding to different digital reader functions, and also create the complete cryptic document of the cryptic graph-text function.

c. The individual cryptic patterns and the complete cryptic document are printed on the surfaces of the reader sheets and the printed sheet, respectively, and form the high-density dot group on each surface. It is also possible to superimpose the decomposed cryptic documents. Thus, the dot groups are overlapped, the colors and patterns are mixed together. The sizes, shapes, direction and spacing of the dots are all different, thus the compressed cryptic document is unable to be separated again and is also unable to be scanned completely. Hence the crypto guard is attained. The informational capacity and the contrast of the cryptic document are also very good.

The advantages of the present invention over the prior art are:

1. The way of discrimination is intuitive, simple, speedy and easy to be spread. It can be used in different environments and with different light sources.

2. The technique comprises of many different kinds of crypto guard and is difficult to imitate. As the content of one cryptic graph-text document is corresponding to several digital readers, one can read corresponding documents on the same cryptic document sheet with different readers. Thus the number of levels of the cryptic anti-counterfeiting pattern (document) is increased and the composed cryptic pattern is unable to be decomposed. The imitator is unable to separate any layer of the composed cryptic pattern or the digital readers. The crypto guard stands more safely against the imitators.

3. The results are kept safe, durable, and true. If the cryptic patterns and digital readers are timely changed, the results can be kept more safe. That is more useful for famous products.

4. The results can be read visually or by computer.

BRIEF DESCRIPTION OF THE DRAWINGS

FIG. 1 is a schematic diagram of the composition of the cryptic graph-text pattern discrimination system.

FIG. 2 is a schematic diagram of grid shape miniaturized lenses of the digital reader.

FIG. 3 is a schematic diagram of step-shaped miniaturized lenses of the digital reader.

PREFERRED EMBODIMENTS OF THE INVENTION

The present invention will be described more detail by reference to the appended drawings.

As shown in FIG. 1, the cryptic graph-text pattern discrimination system comprises printed sheet 1 and the matched digital reader 2. The complete cryptic document comprising the digitized individual cryptic graph-text patterns are printed on the surface of the cryptic document sheet. The appearance of the complete cryptic document is just the high-density dot group 3. The material of the printed sheet can be transparent, translucent or non-transparent.

When the matched digital reader 2 is covered on the surface of printed sheet 1, one can look through the lenses and see the original document on the printed sheet 1. If the visual angle is rotating around the axis from 0 to 360 degrees, the pattern read is alternating from visible to invisible and from light to heavy. When different readers 2 are covered on the surface of the same document sheet different documents are read.

If the material of the printed sheet 1 is transparent or translucent, the digital dot group 3 can be fixed on both side of the printed sheet 1 by double side pressing or rolling. Due to the refraction and reflection of transparent light, one can see some cryptic patterns on sheet 1 and when a matched reader 2 is covered on it one can see some other cryptic patterns.

Figure 4:
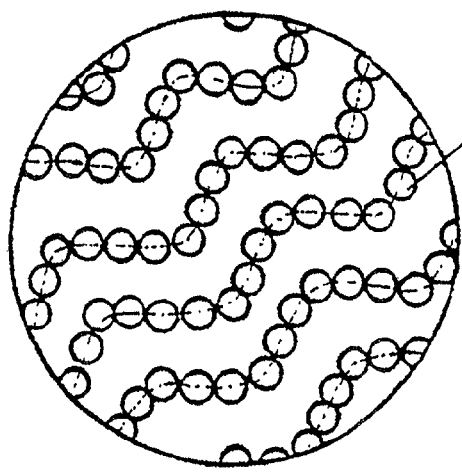
FIG. 4 is a schematic diagram of wavelike arranged miniaturized lenses of the digital reader.
Figure 5:
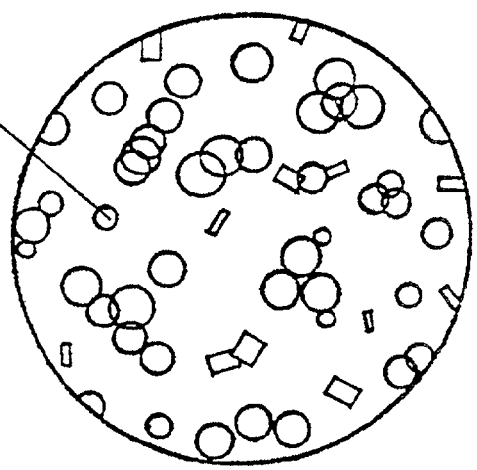
FIG. 5 is a schematic diagram of specially arranged miniaturized lenses of the digital reader.
Figure 6:
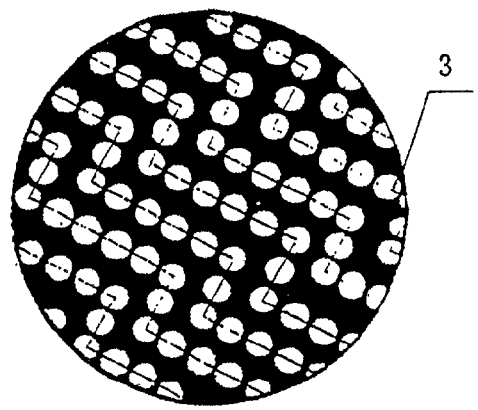
FIG. 6 is a schematic diagram of transparent holes of the digital reader.

As shown in FIGS. 2 through 6, the surface of the reader 2, as a whole or divided into several parts, are covered by different kinds of omni-directional lens arrays and the surface of the vein is uneven or smooth and many miniaturized lenses with specific focal lengths are distributed on it. All arrays are fixed with convex lenses or holes or both of them. The lenses/holes are arranged in accordance with the high-density dot group 3 of one of the individual cryptic patterns and which is digitized beforehand. The lenses can be in grid arrangement or in step-shaped or in wavelike pattern or with special combination. As shown in FIG. 5, the shapes and the sizes of individual lens and the pole coordination and the polar angle of the arrangement, the spacing, and the focal lengths of the lenses can all be adjusted when needed. The omni-directional lens array used is different from those of parallel cylindrical grating. The material, transparency, refractive index, and the composition of colors can all be changed and create specific combinations. The control of the parameters of the cryptic anti-counterfeiting products is highly arbitrary and unique, and the reverse engineering of the parameters is impossible. It is easy to define the parameters and produce the products. The decomposition, imitation and reproduction are very difficult. Even the pattern of the copy reproduced looks very similar to the real one, but the small difference of the parameters will cause the changes of the focal length and the focus, thus the pattern would be blurred and the contrast become worse and part of the document would be missing when read the cryptic document through a digital reader 2.

Digital readers 2 are made of transparent or translucent material such as plastic or colloid and the plastic material may be PET, PVC, PC, PE, ABS and PP. In order to prevent the reproduction of the digital readers 2, some cryptic patterns can be fixed on the surface near the edge and another digital reader can read these patterns.

The appearance of the digital reader is like a credit card or any other form. It can be a rigid card or a flexible one. For a rigid card, it is easy to be carried and checked, and a flexible card conforms to curve surfaces.

Figure 7:
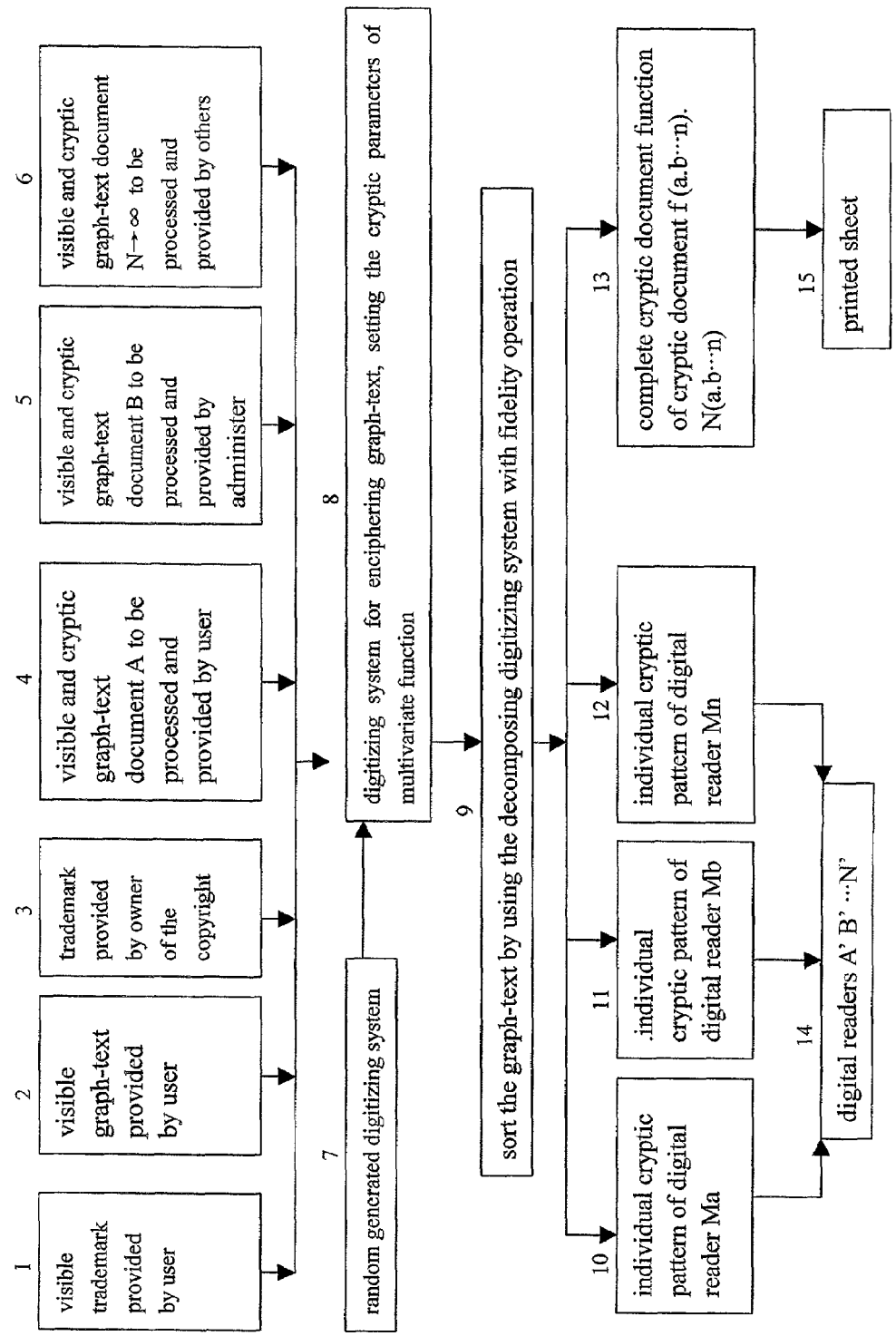
FIG. 7 is a flow diagram of the producing procedure of the cryptic graph-text pattern discrimination system.

As shown in FIG. 7, the producing method of the system for discrimination of cryptic graph-text document is: the system includes the printed sheet 1 and the matched digital reader 2. Enciphering/digitizing the visible and cryptic graph-text documents step by step by the use of randomly generated enciphering system, results in the digital graph-text document. Enciphering parameters of the multivariate function are assigned in each step and then the parameters are deleted before the next step is commencing for the sake of keeping secrecy. Then, decompose the graph-text documents by the operational decomposing digitizing system and create different individual cryptic patterns for the corresponding digital reader functions and the complete cryptic document for the cryptic document function, respectively. Then, fix the documents on the surfaces of the digital reader 2 and printed sheet 1, respectively, and form the high-density dot groups by the use of high-precision optical output instruments. Then superimpose the decomposed cryptic graph-text documents so that the multi-dot groups are overlapped. The colors and patterns are mixed together. The sizes, shapes, directions and spacing of the dots are all different. The cryptic document is thus created with numerous parameters.

The relationship of above-mentioned individual cryptic patterns and the complete cryptic document can be expressed as follows:

the enciphering system is $M = f(a) \times f(b) \times \ldots \times f(n)$

Again suppose $M(a, b, \ldots n) = f(a, b, \ldots n) \times N(a, b, \ldots n)$ $= Ma + Mb \ldots Mn$ $= fa(Na) + fb(Nb) + \ldots + fn(Nn)$ Mn is the individual cryptic pattern of the decomposed digital reader. Nn is the $N^{th}$ individual cryptic document of the complete cryptic document.

$fa(Na) + fb(Nb) + \ldots + fn(Nn) = f(a, b \ldots n) \times N(a, b \ldots n)$

That is: The complete cryptic document is the sum of the individual cryptic document.

The method of making a printed sheet with the cryptic graph-text document and a digital reader with the cryptic pattern on the surfaces is as follows:

Suppose that, the $1^{st}$ individual cryptic graph-text document is A the $2^{nd}$ individual cryptic graph-text document is B the $N^{th}$ individual cryptic graph-text document is N and N can approach infinity.

With reference to FIG. 7, digitizing the cryptic graph-text document A, B and the visible graph-text document is as follows: Firstly, input the operational digitizing system of document: enciphering and executing the digitizing process. Secondly, enter the operational decomposing digitizing system and enter and sort the graph-text documents, resulting in the individual pattern of the digital reader A' and B' and the complete cryptic graph-text document of the cryptic graph-text documents. By the use of high-precision optical output instruments, the individual cryptic pattern of the digital reader A' is fixed on the surface of the digital reader A', the individual cryptic pattern of the digital reader B' is fixed on the surface of the digital reader B'; and the complete cryptic graph-text document of the cryptic graph-text documents is fixed on the surface of the printed sheet. If the digital reader A' is covered on the right position and the right orientation of the printed sheet, the individual document A is revealed and if the digital reader B' is covered on the right position and the right orientation of the printed sheet, the individual document B is revealed.

The same cryptic document or two different cryptic documents can be fixed on both sides of one printed sheet.

The technique of fixing the cryptic document onto the surface of the document sheet is by printing, silk-screen printing, electronic printer, gilding press, heat pressing, biting in, photo etching, hologram, stamping, thermoplastic technique, transcription, and so on.

In order to enhance the concealment of the anti-counterfeiting products, more than one cryptic document can be placed on the surface of a printed sheet and the same number of readers are also used to read the corresponding documents on that printed sheet.

The anti-counterfeiting products are suitable to many applications such as ID cards, permits for admission, different passes and licenses, passports, credit cards, intelligent cards, different magnetic cards, computer software, hard discs, LDs, stamps, money notes, bills, checks, receipts, birth certificates, contracts, permits, documents for clearing customs, and packages of famous products that need anti-counterfeiting measure.

A method of making printed sheet with cryptic graph-text documents, and digital readers on both sides is as follows:

As described above and is shown in FIG. 7, the material of the printed sheet is transparent or translucent and cryptic documents are fixed on both sides of the sheet. The technique of fixing the cryptic documents on both sides of the printed sheet is by rolling or by pressing. Due to the refraction and the reflecting of the transparent light, a special pattern can be seen on the printed sheet itself, suggesting that the printed sheet is already carrying the cryptic documents. If the corresponding digital reader is covered on the printed sheet, a certain document is revealed. This product can be applied as the sealing strips for package, sealing labels for bottles. and the envelopes of different credentials.

One can read the revealed document either with the naked eye or by the automatic mode discrimination system of the computer. For example: store the special digitized discrimination data of the digital reader in the computer beforehand, then input the cryptic document from the printed sheet to the computer, then let the computer compare the effective digital code collected with the data stored at each corresponding point, by the use of a scanner (use visible light, ultra violet, infrared, or X-ray), point-by-point automatically. If the comparison result is in agreement with what is preset, the result is accepted and the cryptic document would be displayed on the computer screen.

This method can also be used to discriminate the complete cryptic document comprising several individual cryptic documents with same number of special digitized discrimination data groups individually and automatically. If each of the individual comparison result is in agree with the specific cryptic pattern, the complete results are accepted. By this way, the classification of security is achieved.

Any changes and modifications based on the present invention are within the spirit and the scope of the protection of the present invention.

What is claimed is:

1. Discrimination system of cryptic graph-text including printed sheet and a digital reader matched, characterized in that:

the surface of the said printed sheet is fixed with a complete cryptic graph-text document, which comprises several individual cryptic graph-text documents and presents itself as a digital dot group with very high density and each of said individual cryptic graph-text documents is digitized and decomposed;

said printed sheet is made of transparent, translucent or non-transparent material;

said printed sheet can also be fixed with the above mentioned complete cryptic graph-text documents presented as the high density dot groups on both side and said printed sheet is made of the transparent or translucent material;

the surface of the said digital reader is fixed with a complete omni directional lens array or with several arrays on separated parts of the surface; the surface of the vein is uneven or is smooth and many miniaturized lenses with specific focal lengths are distributed on it; and all arrays are fixed with convex lenses or holes or both of them; the lenses are arranged in accordance with the pattern of the high density dot groups that are formed by one of the individual cryptic graph-text pattern digitized and decomposed, whereby the relationship of the individual cryptic graph-text documents and the complete cryptic graph-text documents can be expressed:

the enciphering system is $M=f(a) \times f(b) \times \ldots \times f(n)$, where $M(a,b,KK\ n)=f(a,b,KK\ n) \times N(a,b,KK\ n)=Ma+Mb+KK+Mn=fa\ (Na)+fb(Nb)+KK+fn\ (Nn)$, wherein Mn is the individual cryptic graph-text documents of the decomposed digit reader, Mn is the Nth individual cryptic graph-text documents of the complete cryptic graph-text documents, and $fa\ (Na)+Fb\ (Nb)+KK+Fn(Nn)=f(a,b,KK\ n) \times N(a,b,KK\ n)$, and wherein, the complete cryptic graph text document is the sum of the individual cryptic graph-text documents.

2. The discrimination system of cryptic graph-text according to claim 1, characterized in that: the lenses of omnidirectional lens arrays are arranged in grid pattern or in step-shaped or in wavelike pattern or with special combination.

3. The discrimination system of cryptic graph-text according to claim 1, characterized in that: the digital reader is also fixed with some cryptic patterns on the surface near the edges.

4. The discrimination system of cryptic graph-text according to claim 1, characterized in that: said digital reader is made of transparent or translucent material.

5. The discrimination system of cryptic graph-text according to claim 4, characterized in that: said transparent or translucent material of said digital reader is plastic or colloid.

6. The discrimination system of cryptic graph-text according to claim 1, characterized in that: said digital reader is of rigid card or flexible card.

7. The discrimination system of cryptic graph-text according to claim 1, characterized in that: said printed sheet can be fixed to the licenses, certificates, sealing strips, credit cards, different magnetic cards, intelligent cards, computer software, hard discs, LD, stamps, money notes, bills, receipts, birth certificates, contracts, permits, documents for clearing customs, packages of products, or on the surfaces of porcelain, metal, died plastic articles, wooden articles and dress material.

* * * * *